Sept. 12, 1933.                R. DE CAMP                  1,926,838
                            REGULATING SYSTEM
                           Filed Oct. 14, 1932
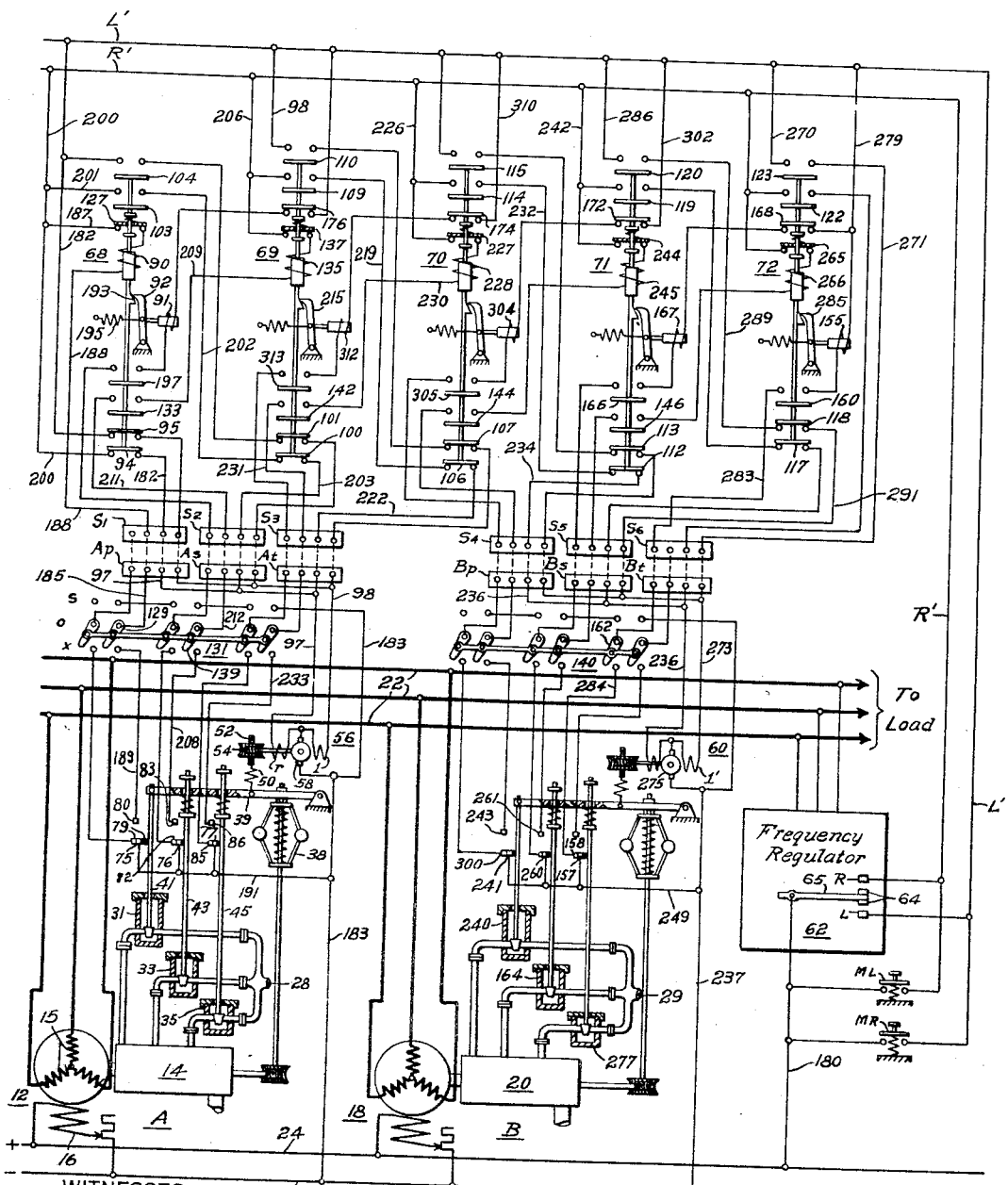
WITNESSES:                                              INVENTOR
                                                      Renan De Camp.
                                                  BY
                                                              ATTORNEY Patented Sept. 12, 1933

1,926,838

UNITED STATES PATENT OFFICE 1,926,838

REGULATING SYSTEM

Renan De Camp, Wilkinsburg, Pa., assignor to Westinghouse Electric & Manufacturing Company, East Pittsburgh, Pa., a corporation of Pennsylvania Application October 14, 1932. Serial No. 637,763

17 Claims. (Cl. 290—4)

My invention relates to regulating systems and has particular relation to systems for automatically transferring, in accordance with a predetermined schedule, the control of a load-adjusting device from one to another of a plurality of parallel-operated machines.

In a copending application, Serial No. 556,348, of J. H. Ashbaugh and R. E. Geiselman, filed Aug. 11, 1931, and assigned to the Westinghouse Electric & Manufacturing Company there is described a system which automatically transfers the control of a load-adjusting device from one to another of a plurality of electrical generating units in accordance with changes in the total load. In that system to which the term "program load control" may be applied, transfer operations, which are initiated by contact closure of load-responsive means associated with the generating unit under regulator control, are caused to proceed in accordance with a predetermined program or schedule. Switching means are described in my copending application, Serial No. 606,158, filed April 19, 1932 and assigned to the same assignee as this invention, which, when combined with a program-load control system, permit the sequence of transfer operations to be changed at the will of an operator, so that an adjustable or selective program or schedule of control transfer is thereby obtainable. The general subject of program-load control is further amplified by a third copending application, Serial No. 606,200 of A. P. Hayward and T. E. Purcell, filed April 19, 1932 in which there is described a system which is especially adapted for supervising the load distribution among multivalve prime mover generating units in such manner as to prevent continued operation thereof within those undesirable ranges of unit loading where the prime mover heat rate is high, and the valve seat wear is excessive.

When arranged in accordance with the teachings of the three copending applications above mentioned, a representative program-load control system involves, in combination with a regulator for controlling the load settings of the several parallel-operated machines or generating units supervised, a motor-operated selector switch for transferring regulator control among the machines and for routing the transfer control circuits, auxiliary control relays, a set of machine and sequence receptacles for changing the transfer-operation schedule, and load-responsive contact-making means, preferably in the form of prime mover valve-operated switches associated with each machine, for actuating the selector switch when a control transfer operation is to be effected. In addition, manually operable switches for causing the selector switch to pass by any one of the several positions within its complete range, to stop when it reaches any one of its positions or, to be adjusted to any of its positions at the will of an operator, and other auxiliary equipment are also included in the system.

In many applications, particularly when the number of control-transfer positions is not large, as when the number of generating units supervised is small, it is found that the motor-operated selector switch, and associated auxiliary relays, constitute an appreciable percentage of the total cost of the complete program-load control equipment.

My invention is directed to an arrangement of interconnected relays which may be utilized to replace the motor-operated selector switch and auxiliary relays associated therewith in a program load control system, which accomplishes the same result, and which, because it is less expensive than the motor-operated switch, is capable of effecting a material saving in the cost of the complete equipment.

Generally stated, the object of my invention is to provide an improved form of apparatus combination in a program-load-control system of the type described which, particularly in applications in which a small number of transfer positions are involved, will reduce the cost of the complete equipment utilized by the system.

More specifically stated, the object of my invention is to provide a combination of interconnected or chain relays disposed intermediate the regulator and the machines supervised in a manner that the regulator control will be automatically transferred from one to another of the machines or units supervised in the same manner as when a motor-operated selector switch and auxiliary relays is utilized in the position named.

A further object of my invention is to provide means whereby an automatic control-transfer system of the chain-relay type may, at the will of an operator, be caused to skip over or pass by any one of the several positions in its transfer-operation program.

An additional object of my invention is to provide means whereby an automatic control-transfer equipment of the chain-relay type may, at the will of an operator, be caused to stop "on position" when it reaches a selected one of the several positions in the complete transfer program.

A further object of my invention is to provide, in an equipment of the type described, means whereby the control of the regulator may, at the will of an operator, be shifted or forced to any one of the several positions in the transfer program.

A still further object of my invention is to provide, in a chain-relay equipment, means whereby a transfer operation can be effected only when contact closure of the transfer-initiating means is supplemented by a suitable load-changing impulse from the regulator.

In practicing my invention, I dispose intermediate the machines supervised and the load-adjusting regulator a plurality of multi-contact selector relays, preferably of the latching type, the actuating circuits of which are interconnected to effect a progressive operation thereof, which operation is controlled by contact-making means responsive to machine loading. This chain of relays is disposed to route or assign, in accordance with a predetermined program, the load-adjusting circuits of the regulator selectively among the several machines. Special manually-operable control switches disposed intermediate the relays and the machines may be utilized to effect the "skip" position, "stop-on" position and "control forcing" features mentioned.

My invention will best be understood through the following description of a specific embodiment thereof, when taken in conjunction with the accompanying drawing in which the single figure is a diagrammatic view of apparatus and circuits arranged in accordance with a preferred form of my invention, shown as being disposed to automatically effect the transfer of the control of a load-adjusting device from one to another of two parallel-operated generating units, each of which is driven by a steam turbine having three input-control valves.

Referring to the drawing, the two generating units which the program-load-control system incorporating my invention is to supervise, are designated generally by A and B. Generating unit A comprises an alternating-current generator 12, connected to be driven by a prime mover 14, illustrated in the form of a steam turbine. The generator is shown as being of the three-phase type comprising armature windings 15 and an exciting field winding 16. Similarly, generating unit B comprises a generator 18 and a prime mover 20.

The armature windings of the generators are connected to a three-phase power circuit 22, while the generator field windings are shown as being energized by direct-current derived from conductors 24 and 26 of positive and negative polarities, respectively. These conductors may be supplied from any suitable direct-current energy source (not shown).

Prime movers 14 and 20 are illustrated as turbines of a well-known multi-valve type, such as is now generally applied in large capacity installations. The turbines may be supplied with driving steam through conduits 28 and 29, respectively, from suitable boilers (not shown). To control the flow of this steam in the most economical manner a plurality of control valves are provided in each of the conduits named.

Prime mover 14, for example, employs a primary valve 31 to control the supply of steam to one set of steam jets in the turbine, a secondary valve 33 to control the supply to a second set of jets, and a tertiary valve 35 to control the supply to a third set of jets. In operation, both the secondary and tertiary valves remain closed until the primary valve has been completely opened, at which time if more steam is required, the secondary valve also opens and causes the second set of jets to aid the first in driving the turbine. After the secondary valve has been completely opened the tertiary valve may open and bring into action the third set of steam jets.

In a similar manner, prime mover 20 is provided with primary, secondary and tertiary input control valves which are represented in the same relative positions as are the valves of prime mover 14.

The position of the movable valve members is determined by a speed-responsive governor mechanism shown, in the case of prime mover 14, as comprising a fly-ball assembly 38 which transmits governing movements to an arm 39 that is shown as pivoted at its right end and connected at its other end to the control valves by means of members 41, 43 and 45, respectively. An increase in the speed of the prime mover acts to move the lever 39 downwardly to close the valves while a decrease in speed similarly acts to move the lever upwardly to open the valves and thus admit more steam. The showing of the valve and governing mechanism for prime mover 20 of unit B is identical with that described for the prime mover 14 of the unit A.

Each prime mover is provided with governor-response-adjusting means, shown for prime mover 14, as comprising a tension spring 50 disposed to exert an upward pull on lever 39. The magnitude of this pull may be adjusted by shifting the vertical position of a spring-securing member 52, illustrated in the form of a threaded rod which cooperates with an interiorly threaded gear wheel 54. Rotation of this gear wheel moves member 52 up or down to effect a change in tension in the spring. It will be apparent that an increase in spring tension will cause the governor 38 to increase the input to prime mover 14, thereby raising the output of generator 15, while a decrease in tension will cause the governor to correspondingly lower the prime-mover input and thus lower the output of the generator.

To rotate gear wheel 54, a load-adjusting motor 56 is provided, which motor may be of any suitable type capable of reversible operation. As shown, it comprises an armature winding 58 and two oppositely wound field windings "$r$" and "$l$". The energization, from a direct-current source, of the armature winding by the circuit through the field winding "$r$" causes the motor to rotate in a direction which tends to raise the speed and output of generating unit A while energization of the motor through the field winding "$l$" causes it to rotate it in a speed- and load-lowering direction. The prime mover of generating unit B is similarly provided with a load-adjusting motor 60 which operates in a manner similar to that just explained for the motor 56.

To control the governor-adjusting motors 56 and 60 of the units A and B, any suitable means for selectively completing the one or the other of the two motor control circuits may be employed. In the system illustrated, a frequency regulator 62 is shown as being provided for this purpose. Inasmuch as the particular structure of the regulator is unimportant in the system of my invention, a complete showing of the details has not been made. As illustrated, it comprises contact members R and L positioned in cooperative relation with members 64, carried by a movable arm 65, the position of which arm is determined by the frequency of the voltage acting in the main power circuit 22 by which the regulator is influenced.

In operation of the regulator, normal frequency of the power circuit voltage causes arm 65 to be maintained in the neutral or intermediate position as illustrated. A decrease in frequency causes the arm 65 to move downwardly, causing contact member 64 to engage stationary member L while an increase in the power circuit voltage frequency causes arm 65 to move upwardly, bringing contact member 64 into engagement with the stationary member R.

It will be understood that frequency-responsive regulators 62 is representative of all types of load-adjusting devices, and may, insofar as the operation of the system of my invention is concerned, be, for example, replaced by an automatic load-responsive regulator, or by manually operable control switches of the type shown at MR and ML. Contact members R and L of the regulator are respectively connected with conductors R' and L', intermediate which conductors and the generating units supervised the combination of selector relays of my invention is disposed.

As is pointed out in the copending applications before mentioned, in order to obtain improved operating efficiency of the generating units, it is desired that load distribution among them be apportioned in some predetermined manner, rather than being allowed to assume a pro-rata division, such as would result were the load-adjusting motors of all the units to be simultaneously subjected to load-changing-impulses from the regulator 62. Thus, as the load demand upon the main power circuit 22, to which the two generators 12 and 18 are directly connected, changes and tends to cause the frequency to differ from a desired value, instead of permitting the regulator to effect changes in the output of both of the generators to restore the frequency, it is desired that the regulator control only one of the units and after the output of this unit has been adjusted to a predetermined value, that the regulator control be suitably transferred to the other unit.

In the prior art program-load-control systems already described, such operation has, as before pointed out, been accomplished by utilizing intermediate the regulator and the machines a motor-operated selector switch which serves to route the regulator control selectively among the units, the switch being actuated by contact-making means influenced by the loading of the unit under control. In the system of my invention, selector relay devices designated generally by reference characters 68 to 72, inclusive, take the place of the selector switch.

In the system illustrated, program selecting switching means are shown as being connected intermediate the selector relays named and the generating units, such means being diagrammatically illustrated in the form of six sequence receptacles S1 to S6, inclusive, and a similar number of machine receptacles, a machine receptacle being provided for each of the three input valves of the two generating units. Thus, generating unit A is provided with receptacles Ap, As and At, associated with the primary, secondary and tertiary valves of turbine 14, respectively, and unit B is similarly provided with receptacles Bp, Bs and Bt.

The sequence and machine receptacles are interconnected by means of removable jumper connections of any suitable type, which connections are represented in the drawing by the dotted lines that connect corresponding pairs of the receptacles. Inasmuch as the specific form of such program-selecting switching means are not claimed in this application, and since they are disclosed and claimed in my previously mentioned copending application Serial No. 606,158, no further detailed description of them is deemed necessary. It will suffice to say that through their use any one of the six sequence receptacles may be connected to any one of the six machine receptacles, thereby permitting the sequence of transfer operations to be set up in any one of a number of different manners.

For purposes of preliminary explanation of the system of my invention, let it be assumed that the electrical connections indicated by the dotted lines, before mentioned as being drawn between the sequence and machine receptacles, are established in the manner shown in the drawing. When such connections are made the control of the regulator will, upon increasing load demand, be assigned to generating unit A continuously during the consecutive opening of the primary, secondary and tertiary valves of this unit. It will then be transferred to generating unit B during the consecutive opening of the primary, secondary and tertiary valves of this unit. It will be understood that load demand changes in the load-decreasing direction will cause this sequence of transfer operations to reverse itself.

Initiation of transfer operations may, as is pointed out in the copending applications mentioned, be effected in any suitable manner by means responsive to the loading of the several generating units supervised. In the system shown, I have illustrated input-valve operated contact mechanisms for this purpose, which are shown as comprising valve-actuated contact members diagrammatically represented in the form best suited to indicate their functioning. Upon the movable member of each input control valve of the generating unit prime movers a contact member is illustrated as being mounted, and in cooperative relation with this contact member two stationary members are shown so positioned that they will be selectively engaged as the valve is moved from the open to the closed position. Electrical connections are made from these contact members through the sequence and machine receptacles associated with the turbine valves to the control circuits of transfer operation effecting means.

Thus, in the generating unit A, contact members 75, 76 and 77 are shown mounted upon the movable elements of the primary, secondary and tertiary valves 31, 33 and 35, respectively. In cooperative relation with the member 75 are disposed stationary contact members 79 and 80. Stationary contact members 82 and 83 are similarly disposed with respect to the movable member 76 of the secondary valve, and contact members 85 and 86 are positioned to be engaged by contact member 77 of the tertiary valve.

In a similar manner, the three-control valves of generating unit B are provided with contact members which, in the closed positions of the valves, engage stationary members suitably positioned in cooperative relation thereto, while in the open positions of the valves a second set of stationary members is similarly engaged.

The raise and lower adjusting circuits brought to the three machine receptacles associated with each of the generating units are paralleled and connected with the governor-adjusting motor of that unit, thereby permitting the motor to be energized through any one of the three receptacles. Thus, in the case of generating unit A the raise and lower motor leads 97 and 98 are connected with the two points shown at the right-hand end of each of the receptacles Ap, As and At.

Receptacle Ap, as has been mentioned, is associated with the primary valve 31 of unit A, As with the secondary valve 33 and At with the tertiary valve 35. The point at the extreme left of each one of these receptacles is arranged for connection with the stationary contact member positioned for engagement when the associated valve is in the closed position, while the second point from the left-hand end of each of these receptacles is similarly connected with the contact member which is engaged when the corresponding valve is in the open position.

The three machine receptacles associated with generating unit B are connected with the valve-actuated contacts of the unit in the same manner as that just outlined for unit A, and an identical connection of the governor-adjusting motor of this unit is likewise represented.

The number of control transfer positions which the selector equipment should be capable of effecting is, of course, determined by the maximum number of transfer operations which it is required that the program load control system effect when the total load demand on all of the generating units controlled changes from minimum to maximum, or from zero to full capacity on all of the machines. In the system illustrated, it is desired that each of the two generating units have three distinct operating or load ranges, determined respectively, by the opening of the primary, secondary and tertiary valves. Hence, the chain-relay selector combination of my invention which is illustrated as capable of effecting six different active positions, one for each valve range of each of the two generating units.

In the relay combination of my invention, the number of selector relays required is one less than the number of transfer positions which the program load control system is to effect. Consequently, in the six-position system illustrated, only five relay devices 68 to 72 inclusive, previously mentioned, are needed. As illustrated, each of these relays is of a multi-contact two-winding type. Relay 68, for example, comprises a main operating winding 90 shown at the central portion of the relay representation, and a release winding 91 illustrated at the right of the device representation. When energized, the main operating winding serves to effect an upward movement of all of the contact members shown as being carried by a central plunger member, which movement allows a latching device 92 to engage a projection on the member and hold it in the upward position. Energization of the release winding serves to disengage this latch and allows the relay plunger to return to the normal or downward position illustrated.

As will become evident, the two relay windings named may be arranged in manners other than the particular one shown as utilizing a latch, the only requirement being that energization of one winding serves to actuate the contact members to one of two positions, in which position the members are retained until energization of the other winding which actuates the members to the second position in which they are similarly retained until a subsequent energization of the first winding.

The five selector relays represented are so interconnected that actuation of relay 68, for example, is necessary before the operating winding of relay 69 can be energized, actuation of relay 69 is necessary to permit the energization of the operating winding of relay 70, and so on. In other words, these relays must always be actuated from the lower position illustrated to the upper position in the same sequence. Likewise, the release coils of the relays are so connected that the return of relay 72, for example, from the upward, to the downward or illustrated position is necessary before the release coil of relay 71 can be energized, relay 71 must be in the downward position before the release coil of relay 70 can be energized, and so on, thus causing the relays to always be actuated from the upward position to the downward position in the same sequence. In the particular embodiment shown, it will thus be seen that the selector relays can be actuated to the upward positions only in the order of 68, 69, 70, 71 and 72 and can be returned to the downward positions only in order of 72, 71, 70, 69 and 68.

Load-adjusting impulses from the regulator 62 are routed to the governor-adjusting motors of the generating units supervised through normally-disengaged contact members of one selector relay, and normally-engaged contact members of the succeeding relay in the sequence chain, except in the cases of those relays at the ends of the chain, in which case the load-adjusting circuits are routed through only one set of relay contact members. Thus, the load-adjusting circuits of the generating unit A which extend through receptacles Ap and S1, include the normally engaged contact members 94 and 95 of selector relay 68, these contact members being directly connected through conductors 200 and 182 to the regulator conductors R′ and L′ at the top of the diagram. Similarly, the load-adjusting circuits of unit A, that extend through receptacles As and S2, are routed through normally-engaged contact members 100 and 101 of selector relay 69 and normally disengaged contact members 103 and 104 of selector relay 68, the last-named contact members being connected directly with regulator conductors R′ and L′.

In a similar manner, the load-adjusting circuits of unit A which extend through receptacles At and S3 are routed through contact members 106 and 107 of selector relay 70 and contact members 109 and 110 of relay 69. The energizing circuits for the load-adjusting motor 60 of generating unit B that extend through receptacles Bp and S4 will be seen to likewise be routed through normally-engaged contact members 112 and 113 of selector relay 71, and normally-disengaged contact members 114 and 115 of selector relay 70, the circuits carried through receptacles Bs and S5 being routed through contact members 117 and 118 of selector relay 72 and members 119 and 120 of relay 71. Finally, the load-adjusting circuits of unit B that extend through receptacles Bt and S6 are routed through normally-disengaged contact members 122 and 123 only of selector relay 72, which is at the end of the relay chain.

As has been mentioned, the energizing circuits for the main operating windings of the selector relays are controlled by the load-responsive contact-making means associated with the generating units supervised. Thus, in the case of relay 68, the operating winding 90 is, in the connection shown, energized when contact members 75 and 80 of the primary valve of unit A are engaged, the relay energizing circuit being carried through a blade 129 of a special control switch 131, receptacles Ap and S1, the winding 90 of the relay, a normally-engaged contact member 127 of the relay, conductor R' and regulator contact members R and 64. In a similar manner, the energizing circuit for selector relay 69 includes the set of contact members associated with the secondary valve 33 of generating unit A, control switch 131 receptacles As and S2, a normally-disengaged contact member 133 of selector relay 68, the operating winding 135 of relay 69, normally-engaged contact members 137 carried by this relay, conductor R' and the raise contact members of regulator 62.

It will be seen that the energizing circuit for the operating winding of selector relay 70 similarly includes a normally-disengaged contact member 142 of relay 69, the circuit for the operating winding of relay 71, a normally-disengaged contact member 144 of relay 70, and the actuating circuit for relay 72 a normally-disengaged contact member 146 of relay 71.

It will thus be seen that, with the exception of selector relay 68 at the beginning of the sequence chain, the actuation, or contact-member movement to the upward position of the preceding relay is necessary before actuation of any one of the relays can be effected, and that in the case of all of the selector relays actuation can be effected only when the closure of the contact-making means associated with the generator unit under regulator control is supplemented by a load-raising impulse from the regulator.

The special control switch 131 associated with generating unit A is for the purpose of modifying the normal action of the program load control system in a manner to be further explained. Associated with generating unit B is a similar control switch 140. When the blades of these control switches, each of which is of the three-position type, are closed downwardly to position x the program-load-control system will operate in the normal automatic manner.

Energizing circuits for the release coils of the selector relays can be completed only when the regulator 62 supplies a load-lowering impulse simultaneous with the engagement of the proper contact-making means which is responsive to decreasing loads of the generating units supervised. Thus, the energizing circuit for release coil 155 of selector relay 72 includes contact members 157 and 158 actuated by the tertiary valve of generating unit B, blade 162 of control switch 140 receptacles Bt and S6, normally-disengaged contact members 160 of relay 72, the release coil 155, conductor L' and the "lower" contact members of regulator 62.

The release coil circuit for relay 71 will be seen to likewise include a set of contact members associated with the secondary valve 164 of generating unit B, the control switch 140, receptacles Bs and S5, normally-disengaged contact members 166 of relay 71, the release coil 167 and normally-engaged contact members 168 of selector relay 72. The release coil circuit of selector relay 70 similarly includes a normally-engaged contact member 172 of relay 71, the release circuit of relay 69, normally-engaged contact members 174 of relay 70, and the release circuit of relay 68, normally-engaged contact members 176 of relay 69.

The equipment utilized by the system of my invention now having been generally described, attention may be directed to the manner of operation of the particular system illustrated in the drawing. For such explanation, it will be assumed that the blades of control switches 131 and 140 are closed downwardly to position x, and that the sequence receptacles S1 to S6 are connected with the associating machine receptacles in the manner indicated by the dotted lines.

Let it be assumed that the load circuit 22 supplied by generating units A and B is drawing only a small value of load, in which case both of the units are operating at a low point in their primary-valve-load ranges. For this condition all of the selector relays are in the unactuated downward position illustrated.

An increase in load demand acts to lower the frequency of the power system, thereby causing frequency regulator 62 to effect an upward movement of contact-carrying arm 65 and bring contact member 64 into engagement with member R.

This completes an energizing circuit for load-adjusting motor 56 of generating unit A, which circuit extends from positive control conductor 24, through conductor 180, contact arm 65 and members 64 and R of regulator 62, conductors R' and 200, normally-engaged contact member 94 of relay 68, conductor 182, sequence and machine receptacles S1 and Ap, conductor 97, field and armature windings "r" and 58 of motor 56, and conductor 183, back to negative control conductor 26.

Thus energized, load-adjusting motor 56 effects a change in tension of governor-calibrating spring 50, which tends to further open the primary valve 31 of generating unit A, and thereby raises the output of the unit. When the valve reaches the opened position in which contact member 75 engages member 80, there is set up an actuating circuit for selector relay 68 which is completed when the regulator 62 supplies a load-raising impulse simultaneous with such valve contact engagement. This circuit extends from positive control conductor 24, through conductor 180, contact members 65, 64 and R of regulator 62, conductors R', 200 and 187, normally-engaged contact members 127 of relay 68, the operating winding 90 of this relay, conductor 188, sequence and machine receptacles S1 and Ap, conductor 185, blade 129 of control switch 131, conductor 189, contact members 80 and 75, and conductors 191 and 183 back to negative control conductor 26.

Thus energized, the operating winding 90 of relay 68 effects an upward movement of the plunger element upon which the several contact members are carried, allowing latch 92 to engage projection 193 which prevents return of the plunger until after the latch has been disengaged, a tension spring 195 biasing the latch to the engaged position. In this upward position of the relay, normally-disengaged contact members 103, 104, 133 and 197 have been moved upwardly into engagement with their cooperating contact studs, while normally-engaged contact members 94, 95 and 127 have been disengaged from their cooperating studs. Contact member 127, which is disposed in the energizing circuit of the operating winding, may be specially mounted in a manner, as shown, to delay its disengagement until the relay plunger has practically reached its limit of upward travel.

The disengagement of contact members 94 and 95 interrupts the load-adjusting circuits of motor 56 of generating unit A which are carried through sequence receptacle S1, while the engagement of contact members 103 and 104 serves to reconnect motor 56 with regulator conductors R' and L', through circuits which are carried through sequence receptacle S2. Likewise, the engagement of contact members 133 and 197 of relay 68 set up respectively, energizing circuits for the release coil 91 of relay 68 and the operating winding 135 of selector relay 69, which energizing circuits will be seen to be carried through sequence receptacle S2 and to be controlled by the contact members associated with secondary valve 33 of generating unit A. The disengagement of contact 127, already mentioned, serves to interrupt the energizing circuit of the operating winding 90 of relay 68, the latch device 92 holding the relay in the upward position.

For this new set of conditions in which selector relay 68 is in the upward position, the regulator-control and transfer-initiating circuits are assigned to sequence receptacle S2. Further increase in load demand acts through regulator 62 to engage the "raise" contact members thereof, thereby completing an energizing circuit for motor 56, which extends from positive control conductor 24 through the regulator, conductors R', 200 and 201, contact members 103 of relay 68, conductor 202, normally engaged contact members 100 of selector relay 69, conductor 203, sequence and machine receptacles S2 and As, conductor 97, windings "r" and 58 of motor 56 and conductor 183 back to negative control conductor 26.

Motor 56 thus effects an opening of secondary valve 33 of unit A to take care of the increased load demand. When the valve reaches the open position in which contact member 76 engages member 83 there is completed an actuating circuit for selector relay 69, which circuit extends from positive supply conductor 24 through the regulator 62, conductors R' and 206, normally engaged contact member 137 and operating winding 135 of relay 69, conductor 209, contact member 133 of selector relay 68, conductor 211, sequence and machine receptacles S2 and As, conductor 212, blade 139 of control switch 131, conductor 208, secondary valve contact members 83 and 76 and conductors 191 and 183 back to the negative supply conductor 26.

Thus energized, the operating winding 135 of selector relay 69 effects an upward movement of the relay contact members, allowing the latch device 215 to engage and hold the plunger element in the upward position. For this condition in which both relays 68 and 69 are in their upward positions, the regulator control and transfer initiating circuits have been shifted from sequence receptacle S2 to receptacle S3, such transfer being effected in exactly the same manner as that which has been explained for the shift from receptacle S1 to receptacle S2.

Further increase in load demand causes the regulator 62 to energize motor 56 of generating unit A through a circuit which is very similar to the ones already traced, except that it includes conductor 206, joined with conductor R', contact member 109 of selector relay 69, conductor 219, normally engaged contact members 106 of selector relay 70, conductor 222 and thence to the motor 56, through receptacles S3 and At.

The load-raising adjustment of motor 56 serves to effect an opening of tertiary valve 35 of generating unit A which, when contact member 77 is caused to engage member 86, sets up an actuating circuit for sequence relay 70. This circuit is completed by a subsequent load-raising impulse from the regulator 62 and extends from positive control conductor 24 through the regulator, conductors R' and 226, contact 227 and winding 228 of relay 70, conductor 230, contact members 142 of relay 69, conductor 231, receptacles S3 and At, control switch 131, conductor 233, contact members 86 and 77 of valve 35, and conductors 191 and 183 back to negative supply conductor 26.

Selector relay 70 is thus actuated to and latched in its upward position, this operation effecting a transfer of the regulator-control and transfer-initiating circuits from sequence receptacle S3 to receptacle S4 in which the regulator is in control of the generating unit B and transfer operations are initiated by the contact members associated with the primary valve of that unit.

Further increase in load on the circuit 22 thus causes the regulator 62 to complete an energizing circuit for load-adjusting motor 60 of unit B in the load-raising direction, which circuit extends from the positive supply conductor 24 through the regulator, conductors R' and 226, contact members 114 of relay 70, conductor 232, normally engaged contact member 112 of relay 71, conductor 234, receptacles S4 and Bp, conductor 236, the field and armature windings 275 of motor 60 and conductor 237 back to the negative supply conductor 26.

Thus energized, the motor 60 operates to effect the opening of the primary valve 240 of unit B which, when contact member 241 engages the member 243, sets up an energizing circuit for the operating winding of relay 71. This circuit, which is completed by a subsequent load-raising impulse from the regulator 62, extends from the positive supply conductor 24 through the regulator, conductors R' and 242, contact member 244 and operating winding 245 of relay 71, contact members 144 of relay 70, receptacles S4 and Bp, control switch 140, contact members 243 and 241 and conductors 249 and 237 back to negative supply conductor 26.

Thus energized, the operating winding of selector relay 71 actuates the contact members upwardly, allowing the latch device to maintain the plunger element of the relay in the upward position. This operation shifts the regulator-control and transfer-initiating circuits from sequence receptacle S4 to receptacle S5.

Further increases in load demand on circuit 22 cause the regulator 62 to energize the load-adjusting motor 60 of generating unit B in the load-raising direction through a circuit which includes contact member 119 of relay 71, normally-engaged contact member 117 of relay 72 and the receptacles named. When the secondary valve 164 of generating unit B has reached the open position in which contact member 260 engages member 261, there is completed an actuating circuit for sequence relay 72, which circuit is very similar to those which have already been traced, it including the raise contacts of the regulator 62, conductor R', contact member 265 and the winding 266 of relay 72, contact member 146 of relay 71, receptacles S5 and Bs, control switch 140, and the valve contact members named.

Relay 72 thus moves to and is latched in the upward position, which operation shifts the regulator-control and the transfer-initiating circuits from the sequence receptacle S5 to receptacle S6. It will be observed that the regulator control circuits for the load-adjusting motor 60 of unit B now include contact members 122 and 123 of the relay 72. Generating unit A is now operating at full capacity while unit B is operating within its high-load or tertiary valve range. For this condition all of the selector relays, 68 to 72 inclusive, are latched in their upward positions.

Inasmuch as the complete output capacity of both generating units A and B is now available without further transfer operations, no conductor is brought to the load-raising transfer-circuit point of receptacle S6, transfer operations in the load-lowering direction only being desired for this full-load-operating condition.

The sequence of relay operations effected when the load demand on the generating units supervised is continuously increased from a minimum to the maximum or full capacity of the machines having been examined, attention may now be directed to the selector relay operations which are effected for a continuous decrease in load demand which will now be assumed.

A decrease in the demand on power circuit 22 tends to lower the frequency of the circuit voltage, thereby causing the regulator 62 to effect engagement of contact members 64 and L. This completes a load-lowering energizing circuit for the motor 60 of the generating unit B that extends from the positive supply conductor 24 through conductor 180, contact members 64 and L of the regulator, conductors L' and 270, contact member 123 of relay 72, conductor 271, receptacles S6 and B$t$, conductor 273, field and armature windings 1' and 275 of motor 60, and conductor 237 back to the negative supply conductor 26.

Thus energized, the motor 60 recalibrates the governor of the generating unit B in the load-lowering direction, thereby effecting the closure of the tertiary valve 277 of that unit. When the valve reaches the closed position in which contact member 157 engages with member 158 there is set up an energizing circuit for the release coil of selector relay 72 which circuit is completed by a load-lowering impulse from regulator 62. This circuit extends from the positive supply conductor 24 through conductor 180, contact members 64 and L of regulator 62, conductors L' and 279, release coil 155 and contact member 160 of relay 72, conductor 283, receptacles S6 and B$t$, blade 162 of control switch 140, conductor 284, valve contact members 158 and 157, and conductors 249 and 237 back to the negative supply conductor 26.

Thus energized, the release coil 155 actuates the latching member 285 to the right, allowing the plunger element of relay 72 to move downwardly to its downward position shown in the drawing. This operation shifts the regulator control and transfer-initiating circuits from the sequence receptacle S6 to the receptacle S5.

Further decreases in load demand causes the regulator 62 to complete an energizing circuit for the motor 60 in the load-lowering direction, which is similar to the one just traced, it extending from the positive supply conductor 24 through the regulator 62, conductor L' and 286, contact member 120 of the relay 71, conductor 289, contact member 118 of relay 72, conductor 291, receptacles S5 and B$s$, conductor 273, and the motor 60 back to negative supply conductor 26.

When the secondary valve 164 of the generating unit B reaches the closed position, the contact member 260 engages the member 295 and closes one step in an energizing circuit for the release coil of sequence relay 71, which will be completed upon a load-lowering impulse by the regulator 62. This circuit is very similar to the one hereinbefore traced, it including the regulator 62, conductors L' and 279, contact member 168 of relay 72, the release coil 167 of relay 71, contact member 166 of this relay, receptacles S5 and B$s$, control switch 140 and the valve contacts named.

When such energization occurs, the release coil 167 actuates the latching device of the sequence relay 71 to the right, thereby allowing the plunger element and contact members of the relay to move downwardly to the downward or illustrated position. This operation shifts the regulator-control and transfer-initiating circuits from the sequence receptacle S5 to the receptacle S4.

Further load-lowering impulses from the regulator now energizes the load-adjusting motor 60 of the generating unit B through a circuit which includes the regulator 62, conductor L', contact member 115 of relay 70, contact member 113 of the relay 71 and receptacles S4 and B$p$. When the primary valve 240 of the unit B reaches the closed position, the contact member 241 engages the contact member 300 and closes one step in an energizing circuit for the release coil of the sequence relay 70, which circuit is completed upon a load-lowering impulse from the regulator 62, and includes conductors L' and 302, contact member 172 of relay 71, the release coil 304 and contact member 305 of relay 70, receptacles S4 and B$p$, control switch 140 and the valve contact members named.

When thus energized, release coil 304 unlatches relay 70, allowing the plunger element and contact members to move to the downward position shown. This operation shifts the regulator-control and transfer-initiating circuits from the sequence receptacle S4 to the receptacle S3.

Further load-lowering impulses from the regulator 62 now influence the load-adjusting motor 56 of the generating unit A through a circuit that extends from the positive supply conductor 24 through regulator 62, conductors L' and 98, contact member 110 of relay 69, contact member 107 of relay 70, receptacles S3 and A$t$ and the motor 56 back to the negative supply conductor 26.

When the tertiary valve 35 of the generating unit A reaches its closed position, the contact member 77 engages the contact member 85, and closes one step of an energizing circuit for the release coil of relay 69 which circuit is completed upon a load-lowering operation of the regulator 62 and includes conductors L' and 310, contact member 174 of relay 70, release coil 312 and contact member 313 of relay 69, receptacles S3 and A$t$, control switch 131, and the valve contact members named. When thus energized, release coil 312 unlatches relay 69 and allows the plunger element and contact members thereof to move downwardly to the downward position shown. This operation transfers the regulator-control and transfer-initiating circuits from the sequence receptacle S3 to the receptacle S2.

Further load-lowering operation of the regulator 62 effects the energization of the load-adjusting motor 56 of the unit A in the load-lowering direction through a circuit which includes conductor L', contact member 104 of the relay 68, contact member 101 of relay 69, and the receptacles S2 and A$s$.

When the secondary valve 33 of the unit A has reached its closed position the contact member 76 engages the contact member 82, and closes one step of the energizing circuit for the release coil of the relay 68 which is completed upon a load-lowering operation of the regulator 62, and which includes conductor L', contact member 176 of relay 69, release coil 91 and contact member 197 of relay 68, receptacles S2 and As, control switch 131, and the valve contacts mentioned.

When so energized the release coil 91 unlatches the relay 68, allowing the plunger element and contact members thereof to return to their downward or illustrated position. This operation transfers the regulator-control and transfer-initiating circuits from the sequence receptacle S2 to the receptacle S1.

For this condition it will be seen that the generating unit A is operating within the primary valve load range, the output of the generating unit B having been reduced to the minimum value prior to one of the intermediate load-lowering transfer operations. Since further transfer operations in the load-lowering direction would be useless, no conductor is brought to the load-lowering transfer-point of the sequence receptacle S1.

It has been seen that continuous changes in load demand from minimum to maximum capacity of the machines supervised, consecutively shifts the regulator-control and transfer-initiating circuits from sequence receptacle S1 progressively to receptacle S6, which represents the upper or load-raising limit of the transfer operation. Likewise, a continuous decrease in load demand from the full capacity of the machines supervised, similarly effects a shifting of the regulator-control and transfer-initiating circuits from the sequence receptacle S6 progressively to S1, which represents the limit in the load-lowering direction. It will be apparent that load demand changes of a non-continuous character will, therefore, act to effect an operation of the relay change that is appropriate to cause the desired transfer operations, which will be seen to automatically take place in accordance with predetermined loading conditions of the machines supervised. A selector relay system of the type described, therefore, represents a very effective substitute for the motor-operated selector switch which has formerly been utilized by program-load-control systems of the type under consideration, as before pointed out.

The particular valve sequence schedule described has been chosen for the purpose of making the explanation of the diagram as simple as possible. It will be apparent, however, that insofar as the operation of the relay system of my invention is concerned, interconnections of the sequence and machine receptacles other than the particular one illustrated may be utilized. The effects of, and the manner of carrying out this receptacle interconnection expedient, are more clearly set forth in my copending application, Serial No. 606,158, before mentioned.

As is pointed out in copending application, Serial No. 606,200, also before mentioned, it is highly desirable that means be provided whereby one or more of the generating units supervised by a program load control system may be removed from service without interfering with the operation of the system in its supervision of the remaining units.

In that application there is described means for attaining this result comprising, in association with each one of the generating units, a "skip" switch which is connected in a manner that permits the unit to be left out of, or "skipped" from the program of transfer operations. Switches of this type may be applied to the system of my invention, one form of which has just been described. In the drawing these switches are shown at 131 and 140, already referred to as being respectively associated with the generating units A and B.

Each of these special control switches 131 and 140 is represented as a 6-pole double throw knife switch, a pair of poles being associated with the contact members actuated by each of the input control valves of the prime mover. Thus, in the case of switch 131 for generating unit A, the pair of poles at the left are connected with the primary valve contacts of prime mover 14, the middle pair of poles to the secondary valve contacts, and the pair of poles at the right of the switch representation to the tertiary valve contacts.

When the switch 131 is closed in the lower position, designated as $x$, the generating unit is placed under normal control of the automatic transfer system and operates in the manner already explained in detail. It will be seen that the upper studs of switch 131 are all connected to conductor 183 which is connected with the movable contact members actuated by the valve. Thus when the switch is closed in its upper position, designated by $s$, which is the "skip" position, the valve actuated contacts are all short circuited and thus react upon the transfer equipment in the same manner as if these contacts were maintained continuously closed.

It will be observed that control switch 140 is associated with the valve actuated contact members of generating unit B in the same manner as is switch 131 with those of unit A just described.

Consequently, when one of the switches is in the "skip" position $s$, as the program controller or chain-relay system reaches the generating unit in its sequence of operations, it receives an impulse to transfer the regulator control to another unit even if this other unit is more than one position removed from the initial assignment. Inasmuch as the detailed manner in which this action takes place is identical with that which has already been completely described in the copending application referred to, no further description is here deemed necessary. It will be seen that the transfer equipment is enabled, by virtue of the "skip" switches, to take out of service any desired one of the units, and that the operation of the program load control system of my invention is unaffected thereby with respect to the remaining active units.

Should it be desired that the program-load control system interrupt its operation on any one of the units, this result may be obtained by placing the "skip" switch for that unit in the open position designated by $o$ for switch 131. In position $o$ it will be observed that the conductors which are utilized to energize the operating windings of the selector relays are completely disconnected from the valve actuated contacts so that when the selector relay combination reaches a position corresponding to the unit for which the skip switch is opened, further transfer operation cannot be automatically initiated. Consequently, the selector equipment will remain in that particular position until the skip switch is again closed.

It is thus evident that by virtue of the special control or "skip" switches, three different operating conditions are available. When in position $x$, supervision in the normal manner by the program load control system is effected for the generating unit with which the "skip" switch is associated. In position $o$, the program controller is caused to stop when it reaches the particular unit in its sequence of transfer operations, and in position $s$ the program controller passes by the generating unit whenever it reaches it in the sequence of transfer operations, thereby supervising the remaining active units in the system in the normal manner.

It will further be apparent that the equipment illustrated in the drawing is capable of being forced, at the will of an operator, to any one of the operating positions within its range through a proper setting of the "skip" switches and a manipulation of the manual load-adjusting devices ML and MR. Thus assuming that the generating units supervised are operating at a light load condition in which the regulator-control and transfer-initiating circuits are routed through sequence receptacle S1; if it were desired to force the transfer equipment to position 4 in which the regulator control and transfer initiating circuits are assigned to sequence receptacle S4, the special control switch 131 would be closed in its upper position to the position $s$ and the load raising device MR would be manually depressed.

This operation would first complete the actuating circuit for selector relay 68 which, when closed, would complete the actuating circuit for the relay 69, which, in turn, would cause relay 70 to be actuated. The actuation of the relay 70 would effect, in the manner already explained, the assignment of the regulator control and transfer initiating circuits to sequence receptacle S4 which is the condition assumed to be desired.

While I have disclosed the selector relay system of my invention with a program load control system for an electrical power system involving but two generating units controlled by a frequency regulator, each of which units is provided with three separate input control valves, it will be apparent that any number of units having any number of control valves greater or less than three can as successfully be adapted for supervision by it, and further that an automatic regulator of the type illustrated is not an essential part of my novel relay system, it having been seen that the load adjusting impulses which are selectively routed among the several units may be supplied from any desired source.

Although I have shown and described a certain specific embodiment of my invention, I am fully aware that many modifications thereof are possible. My invention, therefore, is not to be restricted except insofar as is necessitated by the prior art and the spirit of the appended claims.

I claim as my invention:

1. In combination, a plurality of parallel-operated machines, means for adjusting the loading of each of said machines, a regulator for controlling said machine-load-adjusting means, means for selectively assigning the control of said regulator among said machines in a given sequence comprising a plurality of interconnected relays, and means for controlling the actuation of said relays in accordance with the loading of the several machines to transfer the control by the regulator from one machine to another in accordance with a predetermined machine-loading schedule.

2. In combination, a plurality of parallel-operated machines, means for adjusting the loading of each of said machines, a regulator disposed to control the said machine-load-adjusting means, means for selectively assigning the regulator control to the load-adjusting means of any one of said machines comprising a plurality of relays, interconnected to operate in a given sequence, and means responsive to the loading of the machine under regulator control for effecting the actuation of said relays to transfer the regulator control from one machine to another in accordance with a predetermined machine-loading program.

3. The combination of a power circuit, a plurality of electrical-machine units connected thereto, means for adjusting the load carried by each unit, a regulator for controlling the operation of said unit-load-adjusting means, and switching means, actuated in accordance with predetermined conditions of unit loading, for transferring the control of said regulator from one to another of said units in accordance with a predetermined unit-loading schedule, said switching means comprising a plurality of relays having actuating means interconnected to allow operation of the relays in a given sequence only.

4. In combination, a plurality of parallel-operated machines having load-adjusting means and a regulator disposed to effect the control thereof, a system comprising a plurality of relays connected between the regulator and the said machine-load-adjusting means, actuating means for each of the relays and contact-making means associated with and responsive to the loading of each of the machines for controlling said relay actuating means, said several actuating means being interconnected to effect the operation of said relays in a predetermined sequence and means controlled in accordance with the actuation of each of said relays for effecting a transfer of the regulator control among the machines.

5. In combination, a plurality of parallel-operated machines and a load-adjusting regulator therefor, of a system for transferring the control of said regulator from one machine to another in accordance with a predetermined schedule comprising a plurality of relays connected intermediate the said regulator and the machines, each of said relays having contact members through which load-adjusting circuits from the regulator are selectively routed to the machines, and means for selectively actuating said relays upon predetermined conditions of machine loading.

6. In combination, a plurality of parallel-operated machines and a load-adjusting regulator therefor, each of said machines having load-responsive contact members associated therewith, a system for transferring the control of said regulator from one machine to another in accordance with a predetermined schedule comprising a plurality of relays connected between the regulator and the machines, each of said relays having contact members through which load-adjusting circuits from the regulator are routed selectively to the machines, and means, including said machine-load-responsive contact members, for causing said relays to be selectively actuated in a given sequence which corresponds to the said predetermined control-transfer schedule.

7. In combination, a plurality of parallel-operated machines and a load-adjusting regulator therefor, each of said machines having load-responsive contact members associated therewith, a system for transferring the control of said regulator from one machine to another in accordance with a predetermined schedule comprising a plurality of relays disposed intermediate the said regulator and the machines, each of said relays having contact members through which machine-load-adjusting circuits are selectively routed to the regulator, an operating winding for actuating the relay, means for holding the relay in the actuated position, a release winding for opening said holding means, and circuits through which energization of said relay operating windings are controlled by said machine-load-responsive contact members.

8. In a load regulating system, a plurality of electrical current generators operated in parallel, a load-adjusting regulator therefor, means for automatically transferring the control of said load-adjusting regulator from one to another of said generators in accordance with a given load-change program in response to predetermined changes in machine loading, comprising a plurality of relays disposed intermediate the said regulator and said machines for selectively assigning regulator control thereto, and means for operating said relays in accordance with the load on the several machines.

9. In a load regulating system, a plurality of electrical generators operated in parallel, a load-adjusting regulator therefor, means for automatically transferring, in accordance with a given load-change program, the control of said load-adjusting regulator from one to another of said generators in response to predetermined changes in machine loading, comprising a plurality of load responsive relays disposed for selectively assigning regulator control to selected machines, the number of said relays being one less than the number of transfer positions through which it is desired to selectively pass as the combined load on all the machines is adjusted from zero to full capacity of the machines.

10. In a load regulator system, a plurality of electrical generators operated in parallel, a load adjusting regulator therefor, means for automatically transferring, in accordance with a given load-change program, the control of a load-adjusting regulator from one to another of said generators upon the actuation of load-responsive means associated with the machines, a plurality of relays having contact members disposed intermediate the said regulator and the generators, the number of said relays being one less than the number of transfer positions through which it is desired to selectively pass as the combined load on all machines is adjusted from zero to the full capacity thereof, operating means for each of said relays, and circuits for energizing said relay-operating means in accordance with the actuation of said machine-load-responsive means.

11. In a system for automatically transferring, in accordance with a given load-change program, the control of a load-adjusting regulator from one to another of a plurality of parallel-operated machines upon the actuation of load-responsive means associated with the machines, the combination of a plurality of relays having contact members disposed intermediate the said regulator and the machines, the number of said relays being one less than the number of transfer positions or separate machine-load ranges through which it is desired to selectively pass as the combined load on all the machines is adjusted from zero to the full capacity thereof, operating means for each of said relays, and circuits for energizing said relay-operating means in accordance with the actuation of said machine-load-responsive means, said relays being interlocked to permit operation thereof in a predetermined sequence only.

12. In a system for automatically transferring, in accordance with a given load-change program, the control of a load-adjusting regulator from one to another of a plurality of parallel-operated machines upon the actuation of load-responsive means associated with the machines, the combination of a plurality of relays having contact members disposed intermediate the said regulator and the machines, the number of said relays being one less than the number of transfer positions or separate machine-load ranges through which it is desired to selectively pass as the combined load on all the machines is adjusted from zero to the full capacity thereof, operating means and releasing means for each of said relays, and circuits for energizing said relay operating and releasing means in accordance with the actuation of said machine-load-responsive means, said relays being interlocked to permit operation thereof in a predetermined sequence only and release thereof in a sequence which is the reverse of the said predetermined operating sequence.

13. In a system for automatically transferring, in accordance with a given load-change program the control of a load-adjusting regulator from one to another of a plurality of parallel-operated machines, said system comprising a plurality of selector relays disposed intermediate the said regulator and the machines for the purpose of selectively assigning regulator control thereto and means for actuating said relays in response to predetermined changes in machine loading, the combination of means for causing said selector relays to pass by, in the sequence of transfer operations, a position corresponding to any one of said machines.

14. In a system for automatically transferring, in accordance with a given load-change program the control of a load-adjusting regulator from one to another of a plurality of parallel-operated machines each of which is provided with load-responsive contact members, said system comprising a plurality of selector relays disposed intermediate the said regulator and the machines for the purpose of selectively assigning regulator control thereto and means, comprising said machine-load-responsive contact members, for actuating said relays in response to predetermined changes in machine loading, the combination of means for causing said selector relays to pass by, in their sequence of transfer operations, a position corresponding to any one of said machines, said means comprising a switch for each machine disposed in its closed or "skip" position to short circuit the said load-responsive contact members associated with that machine.

15. In a system for automatically transferring, in accordance with a given load-change program the control of a load-adjusting regulator from one to another of a plurality of parallel-operated machines, said system comprising a plurality of selector relays disposed intermediate the said regulator and the machines for the purpose of selectively assigning regulator control thereto and means for actuating said relays in response to predetermined changes in machine loading, the combination of means for causing said selector relays to stop on position when they reach any one of said machines in their sequence of transfer operations.

16. In a system for automatically transferring, in accordance with a given load-change program the control of a load-adjusting regulator from one to another of a plurality of parallel-operated machines each of which is provided with load-responsive contact members, said system comprising a plurality of selector relays disposed intermediate the said regulator and the machines for the purpose of selectively assigning regulator control thereto and means, comprising said machine-load-responsive contact members, for actuating said relays in response to predetermined changes in machine loading, the combination of means for causing said selector relays to stop on position when they reach any one of said machines in their sequence of transfer operations, said means comprising a switch for each machine disposed in its open or "stop" position to disconnect the load-responsive contact members of that machine from said actuating means of the selector relays.

17. In a system of automatically transferring, in accordance with a given load-change program the control of a load-adjusting regulator from one to another of a plurality of parallel-operated machines upon the actuation of load-responsive means associated with the machines, said system comprising a plurality of selector relays disposed intermediate the said regulator and the machines for the purpose of selectively assigning the regulator control thereto and means, comprising said machine-load-responsive means, for actuating said relays, the combination of means for permitting actuation of said selector relays only when the said regulator produces a control impulse in the proper direction simultaneous with the actuation of the said machine-load-responsive means.

RENAN DE CAMP.